(12) United States Patent
Narendra et al.

(10) Patent No.: US 12,261,830 B2
(45) Date of Patent: *Mar. 25, 2025

(54) ELECTRONIC DEVICE FOR SECURE COMMUNICATIONS WITH AN AUTOMOBILE

(71) Applicant: SideAssure Inc., Camas, WA (US)

(72) Inventors: Siva G. Narendra, Portland, OR (US); Pradeep H. Rajashekarappa, Bangalore (IN); Andrew James Thomas, Wilsonville, OR (US)

(73) Assignee: SideAssure, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,155

(22) Filed: Nov. 20, 2023

(65) Prior Publication Data

US 2024/0348587 A1    Oct. 17, 2024

Related U.S. Application Data

(63) Continuation of application No. 17/933,035, filed on Sep. 16, 2022, now Pat. No. 11,824,843, which is a
(Continued)

(51) Int. Cl.
| | |
|---|---|
| H04L 9/00 | (2022.01) |
| H04L 9/32 | (2006.01) |
| H04L 9/40 | (2022.01) |
| H04W 4/02 | (2018.01) |
| H04W 4/40 | (2018.01) |
| H04W 4/80 | (2018.01) |
| H04W 12/03 | (2021.01) |

(Continued)

(52) U.S. Cl.
CPC ........ *H04L 63/0428* (2013.01); *H04L 9/3271* (2013.01); *H04L 63/0492* (2013.01); *H04W 4/80* (2018.02); *H04L 2209/80* (2013.01); *H04L 2209/84* (2013.01); *H04W 12/63* (2021.01)

(58) Field of Classification Search
CPC ..... H04L 63/0428; H04L 9/3271; H04W 4/80
USPC .......................................................... 713/156
See application file for complete search history.

(56) References Cited

U.S. PATENT DOCUMENTS 8,526,606 B2    9/2013  Muthaiah
9,960,915 B2 *  5/2018  Ahn ...................... H04L 9/0869
(Continued)

FOREIGN PATENT DOCUMENTS

WO        2018079600 A1    5/2018

OTHER PUBLICATIONS

Tobias Glocker; A Protocol for a Secure Remote Keyless Entry System Applicable in Vehicles using Symmetric-Key Cryptography; IEEE:year:2017; pp. 310-315.*
(Continued)

*Primary Examiner* — Monjur Rahim
(74) *Attorney, Agent, or Firm* — MUGHAL GAUDRY & FRANKLIN PC

(57) ABSTRACT

A mobile device securely communicates with an electronic device within an automobile. The mobile device transmits encrypted spatial state information and the electronic device provides commands to the automobile in response. Spatial state information may include location, motion, or the like. Commands to the automobile may include door unlock commands, remote start commands, horn honk commands, or the like.

19 Claims, 8 Drawing Sheets

Related U.S. Application Data continuation of application No. 15/986,954, filed on May 23, 2018, now Pat. No. 11,496,445.

(51) Int. Cl.
  *H04W 12/06* (2021.01)
  *H04W 12/122* (2021.01)
  *H04W 12/63* (2021.01)
  *H04W 12/68* (2021.01)

(56) References Cited

U.S. PATENT DOCUMENTS

| | | | | |
|---|---|---|---|---|
| 10,277,597 | B2* | 4/2019 | Darnell | H04L 9/3234 |
| 10,538,220 | B1* | 1/2020 | Tyagi | B60R 25/245 |
| 2004/0064698 | A1 | 4/2004 | Zhang | |
| 2008/0250243 | A1* | 10/2008 | Bretheim | H04L 9/3271 |
| | | | | 713/168 |
| 2011/0055564 | A1 | 3/2011 | Porsch et al. | |
| 2011/0138192 | A1 | 6/2011 | Kocher et al. | |
| 2013/0212659 | A1 | 8/2013 | Maher et al. | |
| 2013/0230173 | A1 | 9/2013 | Hori | |
| 2014/0079217 | A1 | 3/2014 | Bai et al. | |
| 2015/0113280 | A1 | 4/2015 | Maruyama | |
| 2015/0264017 | A1 | 9/2015 | Saed et al. | |
| 2017/0033937 | A1* | 2/2017 | Yazdha | H04L 12/12 |
| 2017/0142078 | A1* | 5/2017 | Lee | H04L 63/06 |
| 2017/0164192 | A1 | 6/2017 | Schussmann et al. | |
| 2017/0336203 | A1* | 11/2017 | Barnes | G01S 17/88 |
| 2017/0338961 | A1 | 11/2017 | Cho et al. | |
| 2018/0054319 | A9 | 2/2018 | Yazdiha | |
| 2018/0232971 | A1* | 8/2018 | Schieke | H04L 63/0861 |
| 2018/0265040 | A1 | 9/2018 | Nowottnick et al. | |
| 2019/0222423 | A1 | 7/2019 | Takemori et al. | |
| 2019/0222565 | A1* | 7/2019 | Caramico | H04L 9/0869 |
| 2019/0342275 | A1 | 11/2019 | Olive et al. | |
| 2020/0107165 | A1* | 4/2020 | Pai | H04W 12/047 |
| 2023/0138041 | A1* | 5/2023 | Cosentino | B60R 25/241 |
| | | | | 340/5.61 |

OTHER PUBLICATIONS

Advisory Action notified Apr. 19, 2022 for U.S. Appl. No. 15/986,954.
Advisory Action notified Oct. 30, 2020 for U.S. Appl. No. 15/986,954.
Final Office Action notified Feb. 9, 2022 for U.S. Appl. No. 15/986,954.
Final Office Action notified Jul. 28, 2020 for U.S. Appl. No. 15/986,954.
Lin et al. "GSIS: A Secure and Privacy-Preserving Protocol for Vehicular Communications," IEEE Transactions on Vehicular Technology, vol. 56, No. 6, Nov. 2007, pp. 3442-3456 (15 pages).
Non-Final Office Action notified Aug. 2, 2021 for U.S. Appl. No. 15/986,954.
Non-Final Office Action notified Feb. 6, 2020 for U.S. Appl. No. 15/986,954.
Non-Final Office Action notified Jan. 6, 2021 for U.S. Appl. No. 15/986,954.
Non-Final Office Action notified Mar. 16, 2023 for U.S. Appl. No. 17/833,035.
Notice of Allowance notified Aug. 4, 2022 for U.S. Appl. No. 15/986,954.
Notice of Allowance notified Jul. 5, 2023 for U.S. Appl. No. 17/933,035.

* cited by examiner

ELECTRONIC DEVICE FOR SECURE COMMUNICATIONS WITH AN AUTOMOBILE

CLAIM OF PRIORITY

This application is a continuation of, and claims the benefit of priority to U.S. patent application Ser. No. 17/933,035, filed Sep. 16, 2022, and now issued as U.S. Pat. No. 11,824,843 on Nov. 21, 2023, and which is a continuation of, and claims the benefit of priority to U.S. patent application Ser. No. 15/986,954, filed on May 23, 2018, and now issued as U.S. Pat. No. 11,496,445 on Nov. 8, 2022, and which are incorporated by reference in its entirety.

FIELD

The present invention relates generally to secure communications, and more specifically to secure communications with automobiles.

BACKGROUND

Many automobiles may be subject to a relay attack. For example, a third party electronic listening device may relay a signal from a driver's key fob to a car and record the transmission. The driver does not know that the relay has occurred because the intended action (e.g., door unlock) has been performed, but the result is that the third party now has the ability to perform the intended action without the driver's knowledge.

DESCRIPTION OF EMBODIMENTS

Figure 1:
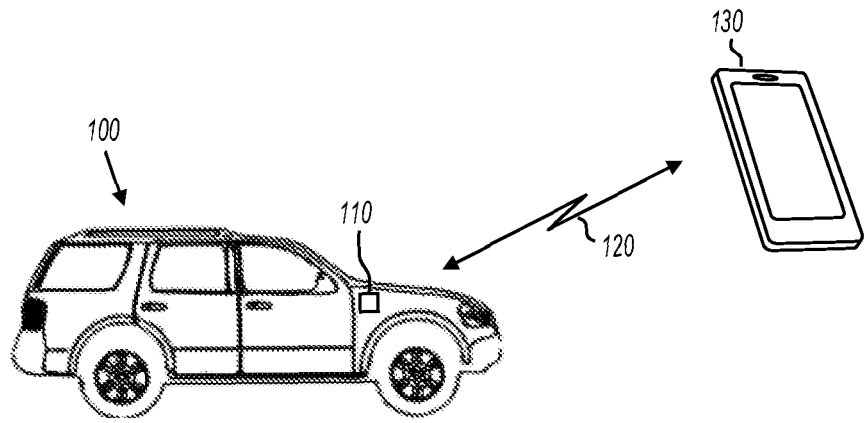
FIG. 1 shows a mobile device communicating with an automobile using an encrypted link in accordance with various embodiments of the present invention.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile device communicating with an automobile using an encrypted link in accordance with various embodiments of the present invention. As shown in FIG. 1, automobile 100 includes electronic device 110 that communicates with mobile device 130 using radio link 120. Mobile device 130 may be any type of mobile device. For example, mobile device 130 may be a mobile phone, a key fob, a credit card form factor, or any other device that is mobile. Electronic device 110 within automobile 100 communicates with mobile device over radio link 120 and communicates with automobile 100 using a physical interface to the automobile which is described further below. The combination of elements shown in FIG. 1 may be advantageously used to provide secure proximity-based commands to automobile 100. For example, in some embodiments, mobile device 130 may be used to provide door unlock commands to automobile 100 over a secure link.

In some embodiments, radio link 120 is a near field radio link and in other embodiments, radio link 120 is a non-near field radio link. For example, radio link 120 may be a Bluetooth™ radio link or may be a near field communication radio link such as ISO 14443 compatible radio link, an ISO 18092 compatible radio link, or an IEEE 802.15.4 compatible radio link.

As used herein, the term "near field" refers to communication protocols and compatible radios in which the maximum intended communication distance is less than the wavelength of the radio wave used for that communication. ISO 14443 is an example of near field because the wavelength is on the order of 870 inches and the intended communication distance is only a few inches. All communications protocols and compatible radios that are not near field are referred to herein as "non-near field." An example of a non-near field protocol is Bluetooth™ because the wavelength is on the order of 4.5 inches and the intended communication distance is typically much greater than 4.5 inches. The use of the term "non-near field radio" is not meant to imply that the distance of communication cannot be less than the wavelength for the non-near field radio.

In operation, electronic device 110 authenticates to mobile device 130 and then mobile device 130 encrypts and provides additional information to electronic device 110 over radio link 120. In some embodiments, the additional information includes spatial state information describing the spatial state of the mobile device 130. For example, global positioning system (GPS) coordinates of the mobile device may be encrypted and sent to electronic device 110. In other embodiments, accelerometer data from mobile device 130 may be sent to electronic device 110. In response to this additional data, electronic device 110 may provide commands to automobile 100. For example, electronic device 110 may provide the door unlock command to automobile 100 or may provide a horn honk command to automobile 100. The present invention is not limited by the type or number of commands sent to automobile 100 by electronic device 110 in response to communications with mobile device 130.

Figure 2:
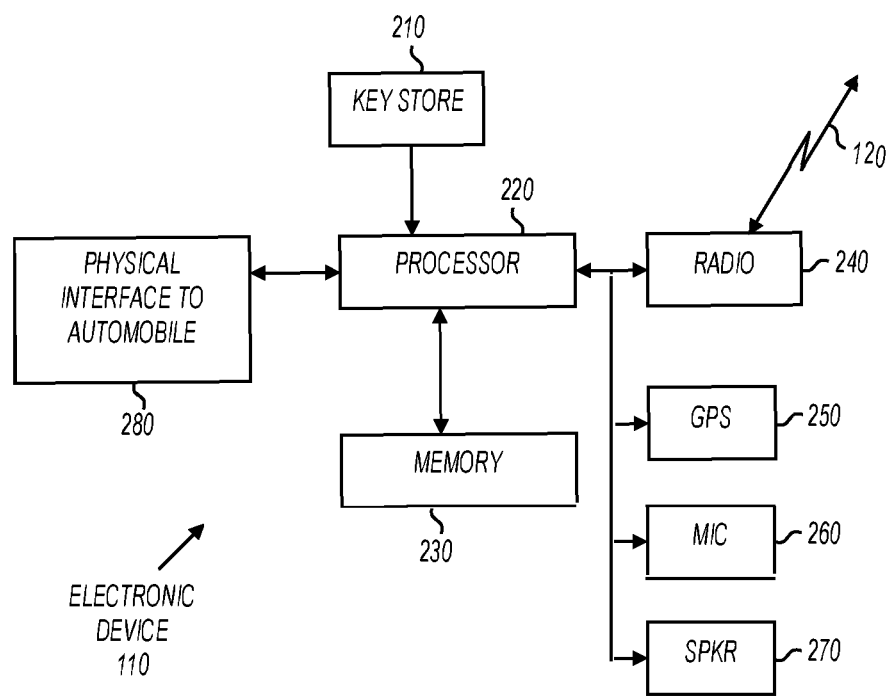
FIG. 2 shows a block diagram of an electronic device in accordance with various embodiments of the present invention.

FIG. 2 shows a block diagram of an electronic device in accordance with various embodiments of the present invention. Electronic device 110 includes key store 210, processor 220, memory 230, radio 240, GPS subsystem 250, microphone 260, and speaker 270. In operation, key store 210 stores cryptographic keys. For example, key store 210 may store one or more symmetric keys or one or more asymmetric keys. An example of key store 210 may be a secure element commonly found in smart card applications.

Processor 220 may be any type of processor capable of executing instructions stored in memory 230 and capable of interfacing with the various components shown in FIG. 2. For example, processor 220 may be a microprocessor, a digital signal processor, an application specific processor, or the like. In some embodiments, processor 220 is a component within a larger integrated circuit such as a system on chip (SOC) application specific integrated circuit (ASIC).

Memory 230 may include any type of memory device. For example, memory 230 may include volatile memory such as static random-access memory (SRAM), or nonvolatile memory such as FLASH memory. Memory 230 is encoded with (or has stored therein) one or more software modules (or sets of instructions), that when accessed by processor 220, result in processor 220 performing various functions. In some embodiments, memory 230 includes a software application to provide commands to an automobile because of secure communications with a mobile device.

Memory 230 represents a computer-readable medium capable of storing instructions, that when accessed by processor 220, result in the processor performing as described herein. For example, when processor 220 accesses instructions within memory 230, processor 220 provides commands to an automobile as a result of secure communications with a mobile device.

Radio 240 is a radio that can communicate over link 120 as shown in FIG. 1. In some embodiments, radio 240 is a near field radio and in other embodiments, radio 240 is a non-near field radio.

GPS subsystem 250 communicates with global positioning system satellites and determines latitude and longitude coordinates of electronic device 110.

Microphone 260 is a device within electronic device 110 that can record sounds within or about electronic device 110, and speaker 270 is a device that can emit sounds within or around electronic device 110.

Physical interface to automobile 280 communicates with processor 220 and also communicates with other systems within automobile 100 (FIG. 1). For example, in some embodiments, interface 280 may connect to a controller area network (CAN) bus within automobile 100 to provide commands to various subsystems within the automobile. In other embodiments, interface 280 may be connected to subsystems within automobile 100 using point-to-point wiring. The manner in which interface 280 is connected to subsystems within automobile 100 is not a limitation of the present invention.

Figure 3:
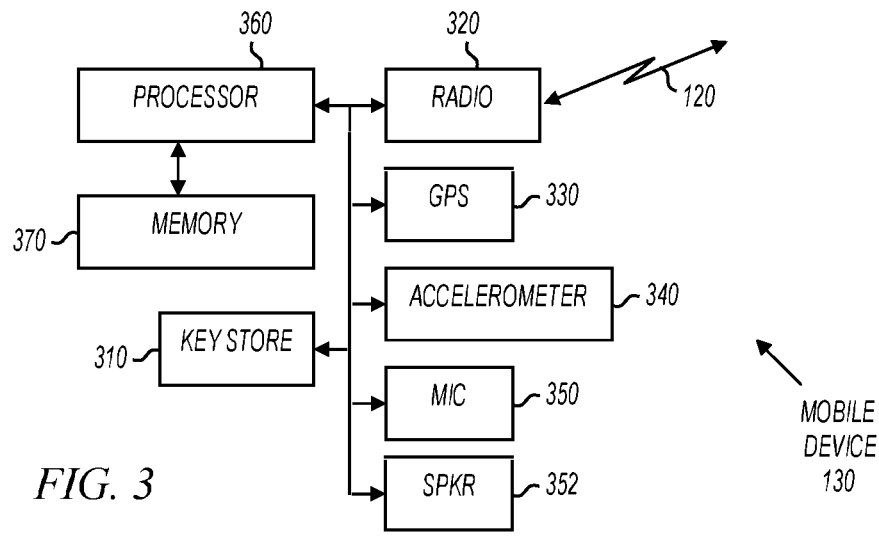
FIG. 3 shows a block diagram of a mobile device in accordance with various embodiments of the present invention.

FIG. 3 shows a block diagram of a mobile device in accordance with various embodiments of the present invention. Mobile device 130 includes key store 310, processor 360, memory 370, radio 320, GPS subsystem 330, accelerometer 340, microphone 350, and speaker 352. In operation, key store 310 stores cryptographic keys. For example, key store 310 may store one or more symmetric keys or one or more asymmetric keys. An example of key store 310 may be a secure element commonly found in smart card applications.

Processor 360 may be any type of processor capable of executing instructions stored in memory 370 and capable of interfacing with the various components shown in FIG. 3. For example, processor 360 may be a microprocessor, a digital signal processor, an application specific processor, or the like. In some embodiments, processor 360 is a component within a larger integrated circuit, such as a system on chip (SOC), or application specific integrated circuit (ASIC).

Memory 370 may include any type of memory device. For example, memory 370 may include volatile memory such as static random-access memory (SRAM), or nonvolatile memory such as FLASH memory. Memory 370 is encoded with (or has stored therein) one or more software modules (or sets of instructions), that when accessed by processor 360, result in processor 360 performing various functions. In some embodiments, memory 370 includes a software application to collect, encrypt, and transmit spatial state information to an electronic device within an automobile.

Memory 370 represents a computer-readable medium capable of storing instructions, that when accessed by processor 360, result in the processor performing as described herein. For example, when processor 360 accesses instructions within memory 370, processor 360 collects, encrypts, and transmits spatial state information to an electronic device within an automobile.

Radio 320 is a radio that can communicate over radio link 120 as shown in FIG. 1. In some embodiments, radio 320 is a near field radio and in other embodiments, radio 320 is a non-near field radio.

GPS Subsystem 330 communicates with global positioning system satellites and determines latitude and longitude coordinates of mobile device 130. In some embodiments, spatial state information that is encrypted and transmitted to an electronic device within an automobile includes the latitude and longitude of mobile device 130.

Microphone 350 is a device within mobile device 130 that can record sounds within or around mobile device 130, and speaker 352 is a device that can emit sounds within or around mobile device 130.

Microphone 350 is a device within mobile device 130 that can record sounds within or around mobile device 130, and speaker 352 is a device that can emit sounds within or around mobile device 130.

Accelerometer 340 detects motion of mobile device 130. In some embodiments, spatial state information that is encrypted and transmitted to an electronic device within an automobile includes information collected by accelerometer 340.

Figure 4:
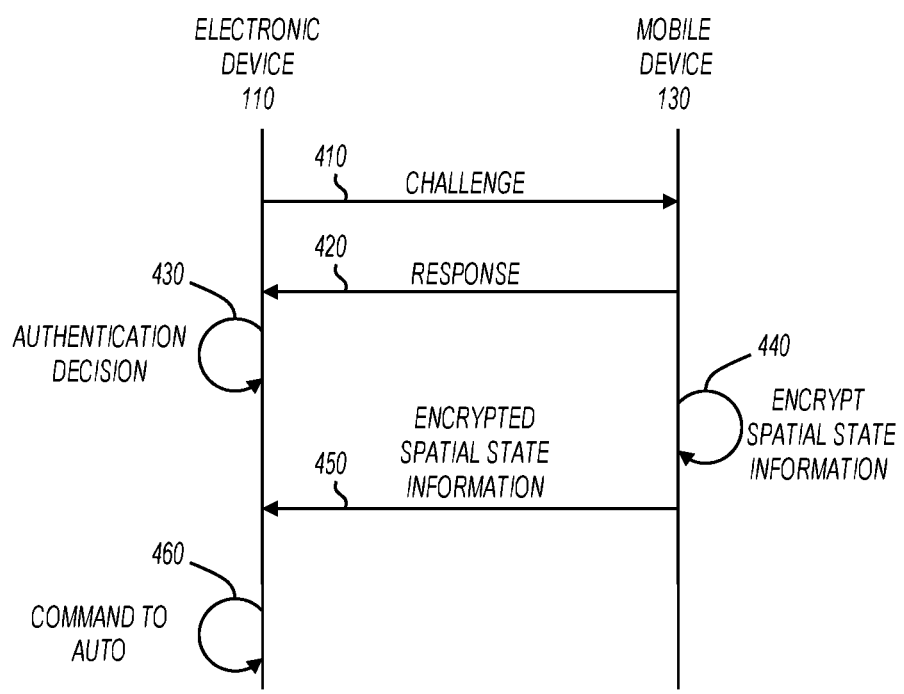
FIG. 4 shows example communications between an electronic device within an automobile and a mobile device in accordance with various embodiments of the present invention.

FIG. 4 shows example communications between an electronic device within an automobile and a mobile device in accordance with various embodiments of the present invention. At 410, electronic device 110 provides a challenge to mobile device 130. At 420, mobile device 130 provides a response. As a result, electronic device 110 makes an authentication decision at 430. In some embodiments, the challenge may include data encrypted with a symmetric key, and the response may include additional information encrypted with the same symmetric key. In other embodiments, the challenge may include data encrypted with a first public key, and the response may include the same data encrypted with a second public key. The form of the challenge/response is not necessarily a limitation of the present invention.

If as a result of the challenge/response, electronic device 110 authenticates mobile device 130, then additional communications may be performed. An example of additional communications is shown at 440 and 450 where mobile device 130 encrypts spatial state information and transmits that encrypted spatial state information back to electronic device 110 over radio link 120. In response to the encrypted spatial state information, electronic device 110 may provide a command to automobile 460.

An example application of the communications shown in FIG. 4 may be for unlocking an automobile door when mobile device 130 is within a certain proximity. For example, after authentication, mobile device 130 may encrypt GPS data generated by the mobile device and send that to electronic device 110 within the automobile. In response, electronic device 110 may compare spatial coordinates of itself with spatial coordinates of mobile device 130 and provide a command to unlock doors if mobile device 130 is within a specific distance.

Another example application of the communications shown in FIG. 4 may be determining which door to unlock or open based on a spatial state of mobile device 130. For example, mobile device 130 may provide GPS coordinates to electronic device 110 and based on where mobile device 130 is located relative to electronic device 110, electronic device 110 may command the automobile to open the driver's door, the passenger door, a hatch or trunk, or any other locked portion of the vehicle.

Figure 5:
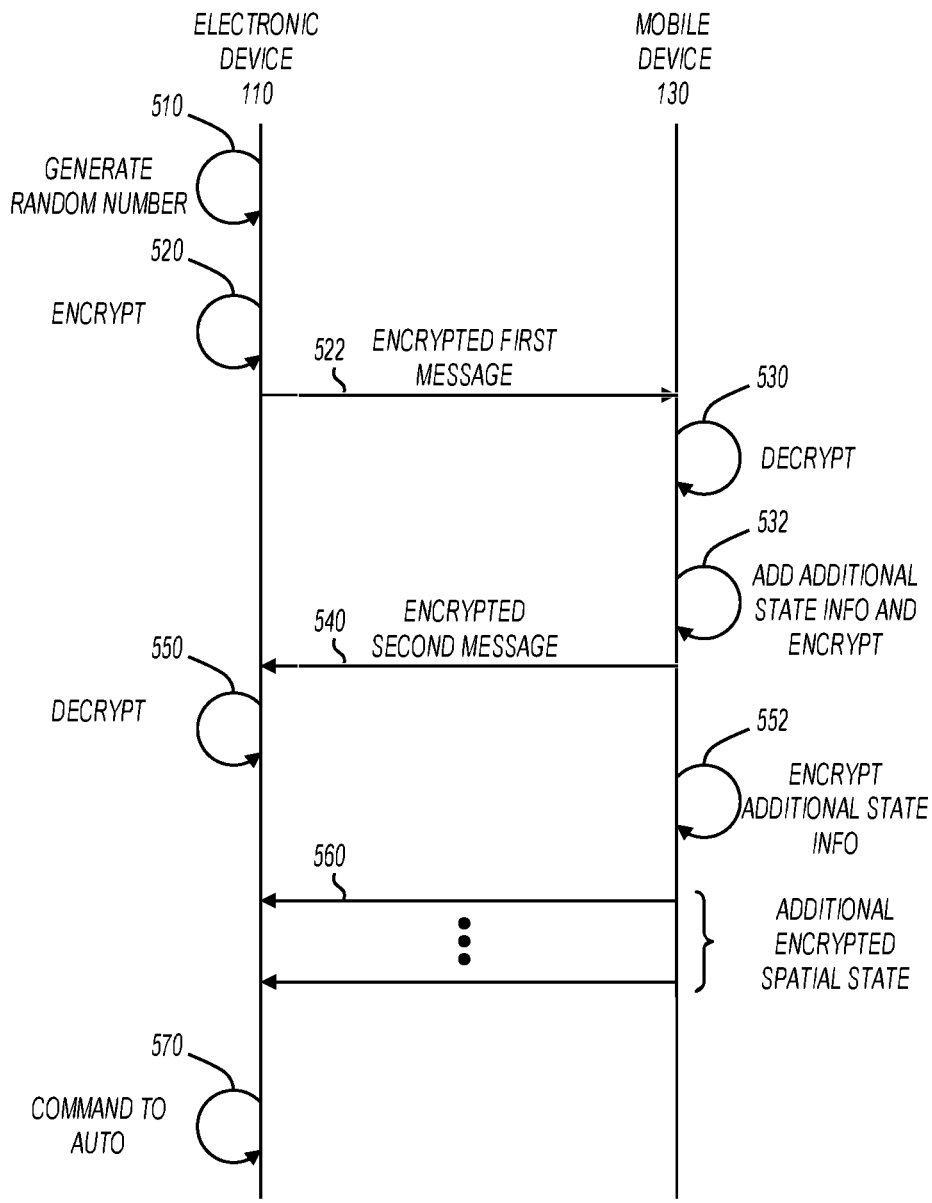
FIG. 5 shows communications between an electronic device and a mobile device in accordance with various embodiments of the present invention.

FIG. 5 shows communications between an electronic device and a mobile device in accordance with various embodiments of the present invention. At 510, electronic device 110 generates a random number and encrypts that random number at 520. The encryption at 520 may be performed using either symmetric or asymmetric keys. Electronic device 110 then transmits that encrypted random number to mobile device 130 as an encrypted first message at 522. Mobile device 130 decrypts the encrypted random number at 530 and adds additional spatial state information to the first message to create a second message.

In some embodiments, the additional spatial state information includes GPS coordinates of mobile device 130. In other embodiments, the additional spatial state information includes accelerometer data, and in still further embodiments, the additional spatial state information includes sounds recorded by microphone 350 (FIG. 3).

Mobile device 130 encrypts the second message at 532. This encrypted second message is transmitted back to electronic device 110 at 540, and is then decrypted by electronic device 110 at 550. In some embodiments, electronic device 110 may authenticate mobile device 130 based on the contents of the second message. For example, if the second message includes the random number generated at 510, then electronic device 110 may authenticate mobile device 130.

Mobile device 130 then encrypts additional spatial state information at 552 and transmits it to electronic device 110 at 560. Any number of transmissions including encrypted spatial state information may be performed at 560. For example, one additional transmission of encrypted spatial state information may be performed or multiple transmissions of encrypted spatial state information may be performed. As a result of the encrypted second message and the additional encrypted spatial state information received by electronic device 110, electronic device 110 provides a command to automobile at 570.

An example of the communications shown in FIG. 5 may be a mobile device transmitting multiple locations over time and electronic device 110 determining the direction and speed with which the mobile device is approaching the automobile. For example, if the mobile device is approaching the driver's door, electronic device 110 may provide a command to unlock the driver's door. Similarly, if the mobile device is approaching a hatch or trunk, then electronic device 110 may provide a command to the automobile to unlock the hatch or trunk.

Figure 6:
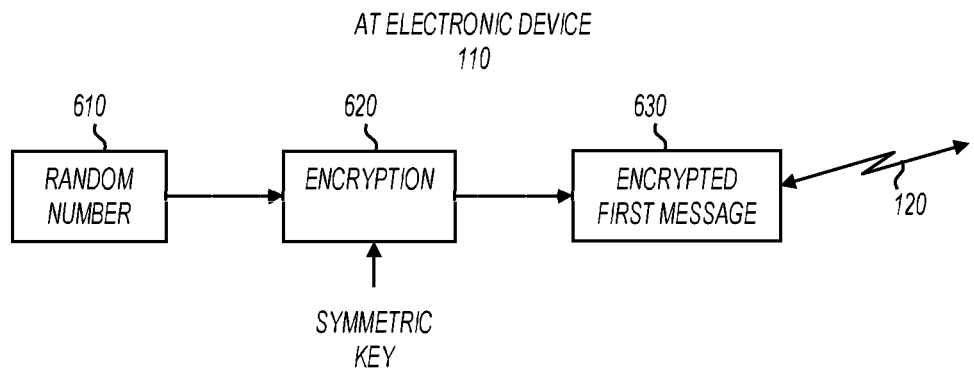
FIG. 6 shows actions performed by an electronic device within an automobile in accordance with various embodiments of the present invention.

FIG. 6 shows actions performed by an electronic device within an automobile in accordance with various embodiments of the present invention. At 610 a random number is generated, and at 620 that random number is encrypted using a symmetric key. This corresponds to actions 510 and 520 as shown in FIG. 5. The encrypted random number is then transmitted as an encrypted first message shown at 630. This corresponds to the transmission between electronic device 110 and mobile device 130 shown at 522 in FIG. 5.

Figure 7:
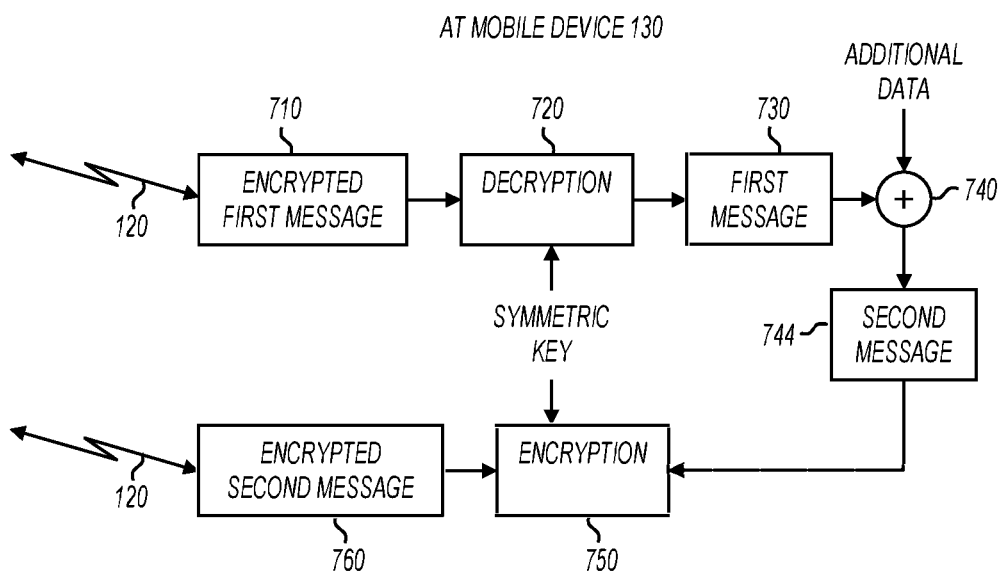
FIG. 7 shows actions taken at a mobile device in accordance with various embodiments of the present invention.

FIG. 7 shows actions taken at a mobile device in accordance with various embodiments of the present invention. An encrypted first message is received at 710. This corresponds to the encrypted first message transmitted at 522 in FIG. 5. At 720, this encrypted first message is decrypted to produce first message 730. This corresponds to the decryption 530 shown in FIG. 5. At 740, additional data is added to this first message to create a second message. In some embodiments the additional data added in at 740 may be GPS coordinates, accelerometer data, sounds recorded by a microphone, or any other data capable of being added to the first message. Second message 744 is encrypted at 750. The decryption at 720 and the encryption at 750 may be performed using a symmetric key, or may be performed using asymmetric keys.

The encryption at 750 corresponds to action 532 shown in FIG. 5. The result of encryption 750 is the encrypted second message 760 which is then transmitted back to electronic device 110 within the automobile. This corresponds to transmission 540 shown in FIG. 5.

Figure 8:
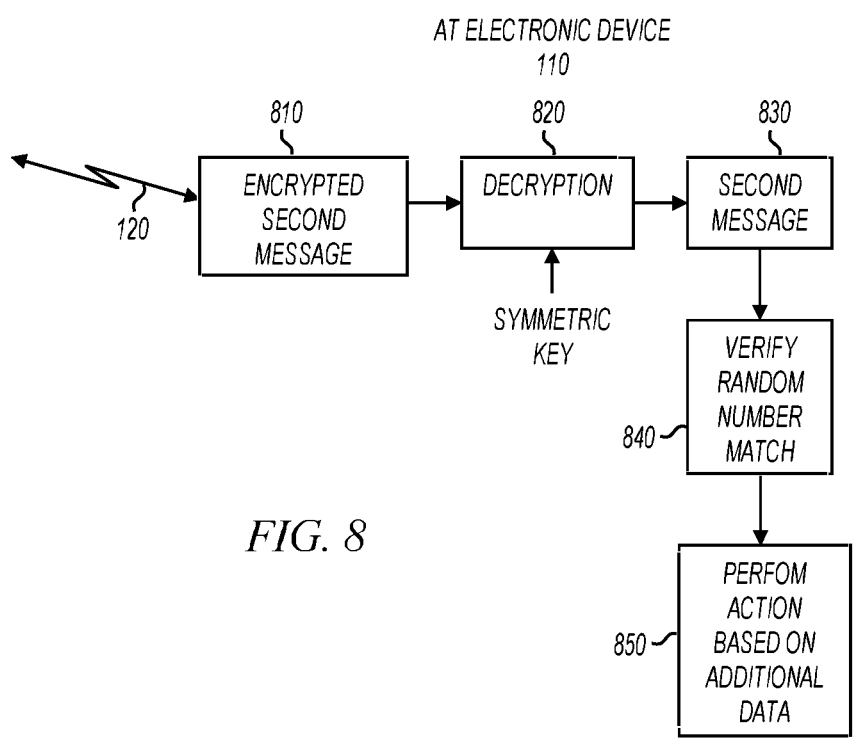
FIG. 8 shows actions performed by an electronic device within an automobile in accordance with various embodiments of the present invention.

FIG. 8 shows actions performed by an electronic device within an automobile in accordance with various embodiments of the present invention. Electronic device 110 receives the encrypted second message at 810 and decrypts that message at 820. The decryption at 820 corresponds to the action at 550 shown in FIG. 5. The resulting second message 830 includes the first message described in FIGS. 6 and 7 as well as the additional data that was added by the mobile device at 740 in FIG. 7. At 840, electronic device 110 verifies that the random number produced at 610 in FIG. 6 matches, and at 850, electronic device 110 performs an action based on the additional data.

Figure 9:
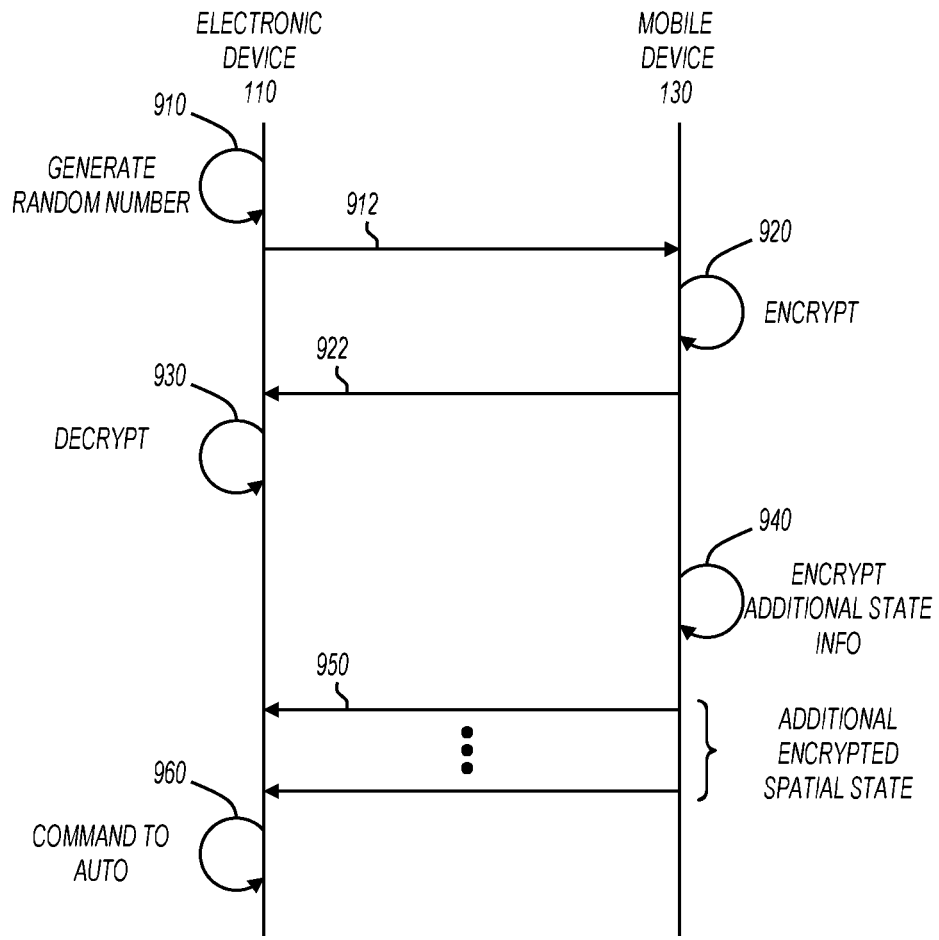
FIG. 9 shows example communications between an electronic device within an automobile and a mobile device in accordance with various embodiments of the present invention.

FIG. 9 shows communications between an electronic device and a mobile device in accordance with various embodiments of the present invention. At 910, electronic device 110 generates a random number and transmits that random number to mobile device at 912. Mobile device 130 encrypts the random number at 920. The encryption at 920 may be performed using either symmetric or asymmetric keys. Mobile device 130 then transmits that encrypted random number to electronic device 110 as an encrypted first message at 922. Electronic device 110 decrypts the encrypted random number at 930. In response to the decryption at 930, electronic device 110 may make an authentication decision. For example, electronic device 110 may authenticate mobile device 130 if the random number generated at 910 matches the message contents decrypted at 930.

Mobile device 130 then encrypts additional spatial state information at 940 and transmits it to electronic device 110 at 950. Any number of transmissions including encrypted spatial state information may be performed at 950. For example, one additional transmission of encrypted spatial state information may be performed or multiple transmissions of encrypted spatial state information may be performed. As a result of the additional encrypted spatial state information received by electronic device 110, electronic device 110 provides a command to automobile at 960.

An example of the communications shown in FIG. 9 may be a mobile device transmitting multiple locations over time and electronic device 110 determining the direction and speed with which the mobile device is approaching the automobile. For example, if the mobile device is approaching the driver's door, electronic device 110 may provide a command to unlock the driver's door. Similarly, if the mobile device is approaching a hatch or trunk, then electronic device 110 may provide a command to the automobile to unlock the hatch or trunk.

Figure 10:
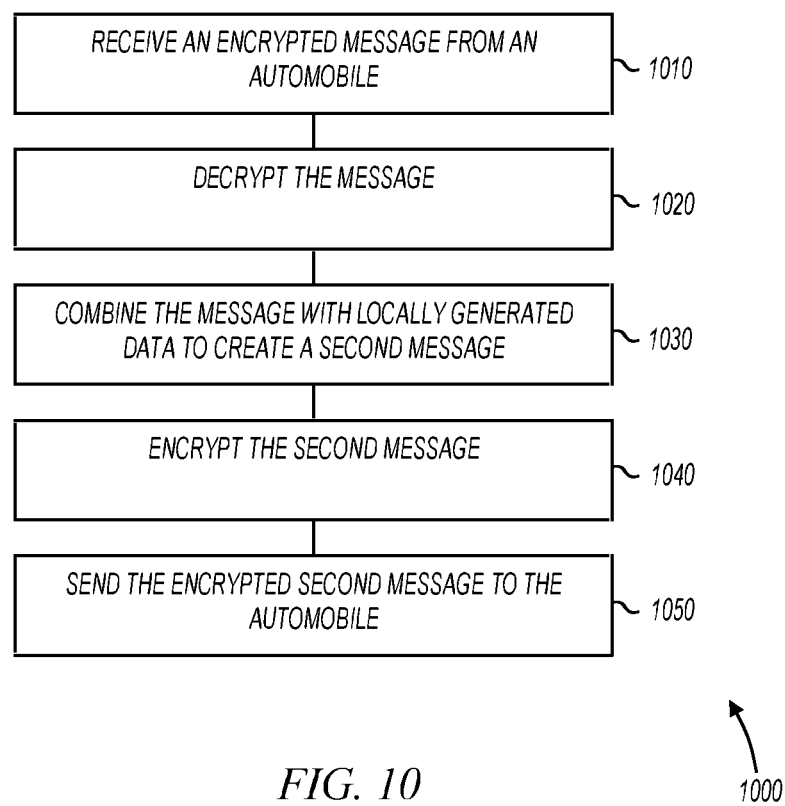
FIGS. 10 and 11 show flowcharts of methods in accordance with various embodiments of the present invention.

FIG. 10 shows a flowchart of methods in accordance with various embodiments of the present invention. In some embodiments, method 1000 may be performed by a mobile device such as any of those shown in previous figures. Further, in some embodiments, method 1000 may be performed by a processor such as processor 360 (FIG. 3). Method 1000 is not limited by the type of system or entity that performs the method. The various actions in method 1000 may be performed in the order presented, in a different order, or simultaneously. Further, in some embodiments, some actions listed in FIG. 10 are omitted from method 1000.

Method 1000 begins at 1010 in which an encrypted message is received from an automobile. In some embodiments, the encrypted message is received using a near field radio, and in other embodiments, the encrypted message is received using a non-near field radio. The encrypted message may include a challenge for authentication purposes. For example, in some embodiments, the encrypted message may include a random number encrypted with either a symmetric key or an asymmetric key.

The message is decrypted at 1020. In some embodiments, the message is decrypted with a symmetric key that is a shared secret between the automobile and the device performing method 1000. In other embodiments, the message is decrypted with an asymmetric key that is only known to the device performing method 1000.

At 1030, the message is combined with locally generated data to create a second message. In some embodiments, the locally generated data includes location data that describes the location of the device performing method 1000. For example, the locally generated data may include GPS data that describes the latitude and longitude of the device performing method 1000. The locally generated data may include other spatial state information. For example, in some embodiments, the locally generated data may include accelerometer data in addition to, or instead of GPS data. The locally generated data may also include recorded sounds or any other data that is generated by the device performing method 1000.

At 1040, the second message is encrypted and at 1050, the encrypted second message is transmitted to the automobile. In some embodiments, the message is encrypted with a symmetric key that is a shared secret between the automobile and the device performing method 1000. In other embodiments, the message is encrypted with a public key that is paired with a private key only known to the automobile. In some embodiments, the encrypted second message is transmitted using a near field radio, and in other embodiments, the encrypted second message is transmitted using a non-near field radio.

In some embodiments, additional messages that include locally generated data are encrypted and transmitted to the automobile. For example, multiple sets of spatial state information describing a spatial state of the device performing method 1000 may be encrypted and sent to the automobile. Any number of messages may be sent without departing from the scope of the present invention.

Figure 11:
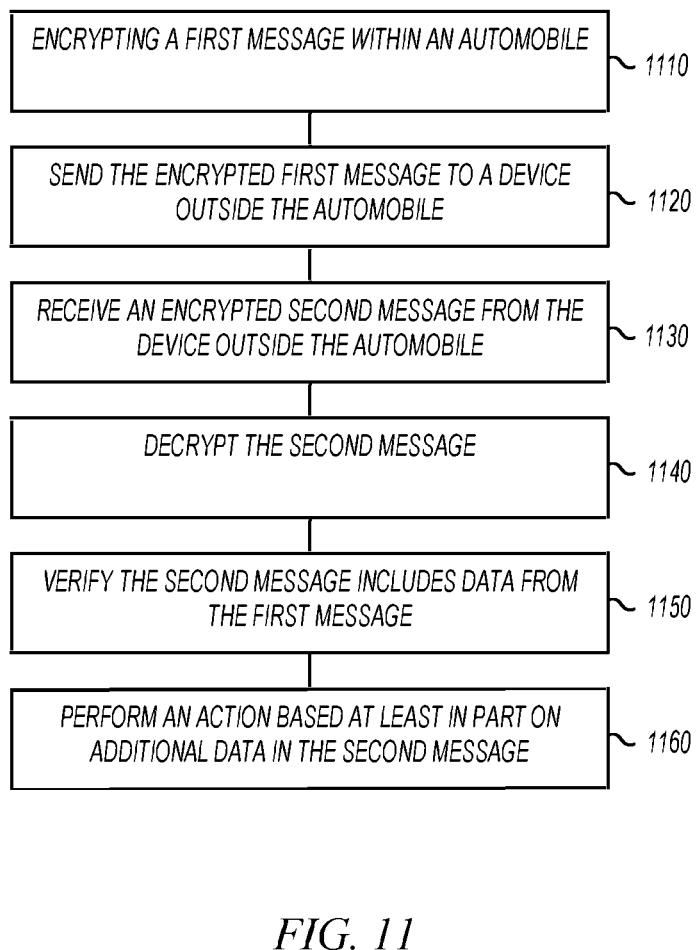

FIG. 11 shows a flowchart of methods in accordance with various embodiments of the present invention. In some embodiments, method 1100 may be performed by an electronic device within an automobile such as any of those shown in previous figures. Further, in some embodiments, method 1100 may be performed by a processor such as processor 220 (FIG. 2). Method 1100 is not limited by the type of system or entity that performs the method. The various actions in method 1100 may be performed in the order presented, in a different order, or simultaneously. Further, in some embodiments, some actions listed in FIG. 11 are omitted from method 1100.

Method 1100 begins at 1110 in which a first message is encrypted within an automobile. In some embodiments, the first message may include a challenge to authenticate a device outside the automobile. For example, the first message may include a random number used to authenticate a mobile device outside the automobile. In some embodiments, the first message is encrypted with a symmetric key that is a shared secret between the automobile and a device outside the automobile. In other embodiments, the message is encrypted with a public key that is paired with a private key only known to the device outside the automobile. At 1120, the encrypted first message is sent to the device outside the automobile. In some embodiments, the encrypted first message is transmitted using a near field radio, and in other embodiments, the encrypted first message is transmitted using a non-near field radio.

At 1130, an encrypted second message is received from the device outside the automobile. In some embodiments, the encrypted second message is received using a near field radio, and in other embodiments, the encrypted second message is received using a non-near field radio. The second message is decrypted at 1140. In some embodiments, the message is decrypted with a symmetric key that is a shared secret between the automobile and the device outside the automobile. In other embodiments, the message is decrypted with an asymmetric private key that is only known to the automobile.

At 1150, method 1100 verifies that the second message includes data from the first message. For example, in some embodiments, the first message encrypted at 1110 may include a challenge, and the second message may include a response to that challenge that can be verified by the automobile. This may take the form of a random number that is encrypted at 1110 and verified in the second message at 1150.

At 1160, an action is performed based at least in part on additional data included in the second message. For example, in some embodiments, the second message may include spatial state information describing a spatial state of the device outside the automobile, and the automobile may perform an action based on that spatial state information.

Also for example, any number of additional messages may be received that include additional spatial state information, and the automobile may perform one or more actions based on the additional spatial state information. Examples include a door unlock, a hatch unlock, a horn honk, and the like.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An apparatus comprising:
    an integrated circuit; and
    a secure communication interface that includes a radio link to allow the integrated circuit to communicate with a vehicle, wherein the integrated circuit is to:
        receive a first message comprising an encrypted data from the vehicle over the radio link, wherein the encrypted data is associated with a first public cryptographic key; and
        send a second message to the vehicle that is associated with a private key generated in response to the first public cryptographic key, wherein the second message includes data comprising spatial state information of the apparatus and the encrypted data from the first message, wherein the apparatus encrypts the second message and transmits back to the vehicle that is decrypted with an asymmetric private key by the vehicle to authenticate the apparatus, wherein the vehicle performs an action based at least in part on the data included in the second message, wherein if the data indicates approach towards a trunk or a hatch of the vehicle, the action includes unlocking or opening the trunk or the hatch of the vehicle.

2. The apparatus of claim 1, wherein the radio link is one of a near-field radio link or a far-field radio link.

3. The apparatus of claim 1, wherein the spatial state information includes location, sound recorded by a microphone, and/or accelerometer data.

4. The apparatus of claim 1, wherein the vehicle is configured to encrypt the first message with a key to generate the first message.

5. The apparatus of claim 1, wherein the first message includes a challenge to authenticate the apparatus.

6. The apparatus of claim 1, wherein the first message includes a random number to authenticate the apparatus.

7. The apparatus of claim 1, wherein if the data indicates an approach towards a door of the vehicle, the action includes unlocking or opening the door of the vehicle.

8. A method performed by a key fob, the method comprising:
    receiving a first message comprising an encrypted data from a vehicle over a radio link, wherein the encrypted data is associated with a first public cryptographic key; and
    transmitting a second message to the vehicle that is associated with a private key generated in response to the first public cryptographic key, wherein the second message includes data comprising spatial state information of the key fob from the first message, wherein the key fob encrypts the second message and transmits back to the vehicle that is decrypted with an asymmetric private key by the vehicle to authenticate the key fob, wherein the vehicle performs an action based at least in part on the data included in the second message, wherein if the data indicates approach towards a trunk or a hatch of the vehicle, the action includes unlocking or opening the trunk or the hatch of the vehicle.

9. The method of claim 8, wherein transmitting the second message comprises applying one of a near-field radio link or a far-field radio link.

10. The method of claim 8, wherein the spatial state information includes location, sound recorded by a microphone, and/or accelerometer data.

11. The method of claim 8, wherein the vehicle is configured to encrypt the first message with a key to generate the encrypted data.

12. The method of claim 8, wherein the first message includes a challenge to authenticate the key fob.

13. The method of claim 8, wherein the first message includes a random number to authenticate the key fob.

14. The method of claim 8, wherein if the data indicates an approach towards a door of the vehicle, the action includes unlocking or opening the door of the vehicle.

15. A non-transitory machine-readable storage media having machine-readable instructions stored thereon, that when executed, causes one or more integrated circuits to perform a method comprising:
    receiving a first message comprising an encrypted data from a vehicle over a radio link, wherein the encrypted data is associated with a first public cryptographic key; and
    transmitting a second message to the vehicle that is associated with a private key generated in response to the first public cryptographic key, wherein the second message includes data comprising spatial state information of the one or more integrated circuits from the first message, wherein the one or more integrated circuits encrypts the second message and transmits back to the vehicle that is decrypted with an asymmetric private key by the vehicle to authenticate the one or more integrated circuits, wherein the vehicle performs an action based at least in part on the data included in the second message, wherein if the data indicates approach towards a trunk or a hatch of the vehicle, the action includes unlocking or opening the trunk or the hatch of the vehicle.

16. The non-transitory machine-readable storage media of claim 15 having the machine-readable instructions stored thereon, that when executed, causes the one or more integrated circuits, wherein transmitting the second message comprises applying one of a near-field radio link or a far-field radio link.

17. The non-transitory machine-readable storage media of claim 15 having the machine-readable instructions stored thereon, that when executed, causes the one or more integrated circuits, wherein spatial state data includes location, sound recorded by a microphone, and/or accelerometer data.

18. The non-transitory machine-readable storage media of claim 15 having the machine-readable instructions stored thereon, that when executed, causes the one or more integrated circuits, wherein the vehicle is configured to encrypt the first message with a key to generate the encrypted data.

19. The non-transitory machine-readable storage media of claim 15, wherein the first message includes a random number to authenticate the one or more integrated circuits.

* * * * *